Figure 1:
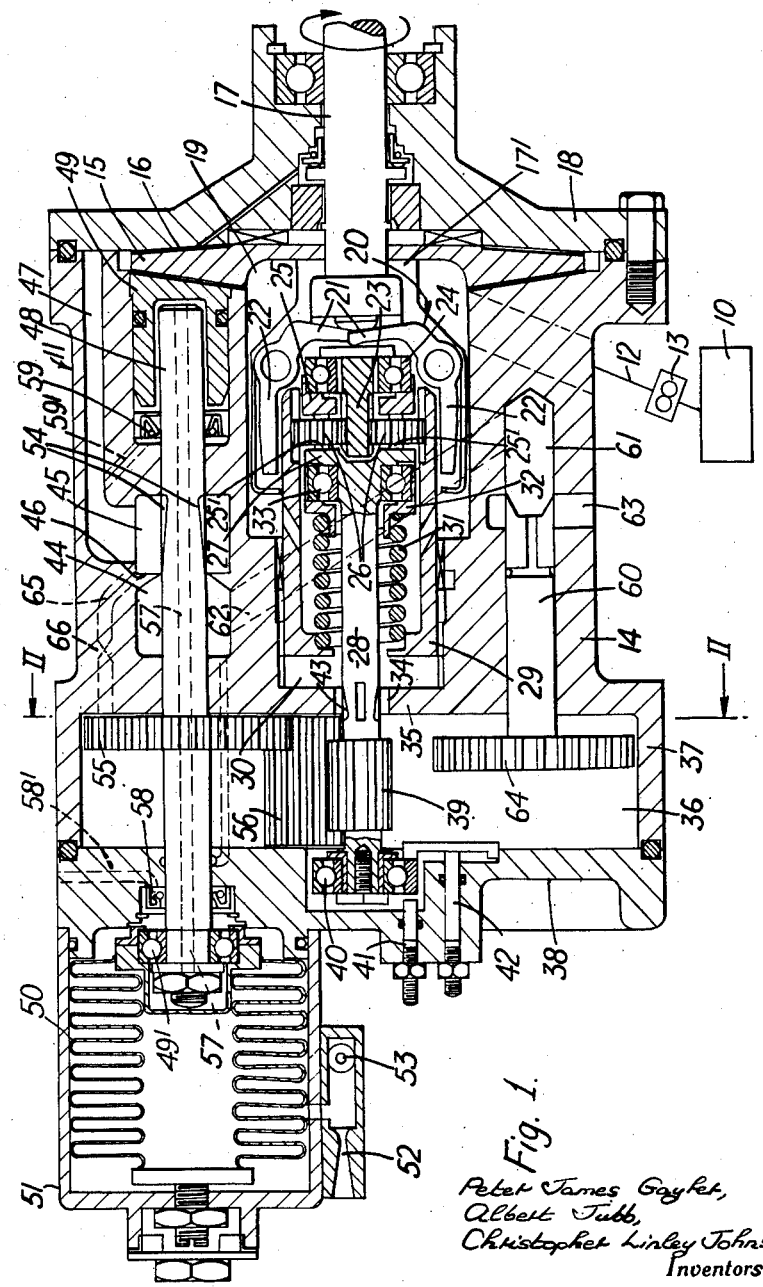

Feb. 5, 1963  P. J. GAYFER ET AL  3,076,310
GAS TURBINE ENGINE FUEL SYSTEM
Filed June 24, 1959  2 Sheets-Sheet 1

Peter James Gayfer,
Albert Tubb,
Christopher Linley Johnson
Inventors

By Leech & Radue
Attorneys

United States Patent Office 3,076,310
Patented Feb. 5, 1963

3,076,310
GAS TURBINE ENGINE FUEL SYSTEM
Peter James Gayfer, Albert Jubb, and Christopher Linley Johnson, Derby, England, assignors to Rolls-Royce Limited, Derby, England, a company of Great Britain
Filed June 24, 1959, Ser. No. 822,580
Claims priority, application Great Britain Sept. 1, 1958
7 Claims. (Cl. 60—39.28)

This invention concerns a gas turbine engine fuel system and, although its use is not so restricted, it is especially well suited for use on jet lift engines.

Broadly, the present invention comprises a gas turbine engine fuel system comprising a throttle valve body having a port therein, a valve obturating member movable in said valve body so as to throttle fuel flow through said port, means for applying to one side of the obturating member a first fluid pressure which varies in accordance with the value of a first engine variable, and means for applying to the other side of the obturating member a second fluid pressure which varies in accordance with the value of a second engine variable, the position of the obturating member in the throttle valve body being controlled solely by the fluid forces acting on it.

It may be arranged that one of said engine variables is the outlet pressure of a compressor of the engine, while the other engine variable is engine speed.

In its preferred form the present invention comprises a gas turbine engine fuel system comprising a fuel pump, a conduit connecting the delivery side of the pump to one side of the obturating member, a metering orifice in said conduit, means for varying the size of the orifice in dependence upon the value of a given engine pressure, a passage interconnecting the conduit, on the upstream side of the metering orifice, with the other side of the obturating member, and governor means for varying the pressure of the fuel in the passage when the engine rotational speed exceeds a predetermined value, the position of the obturating member in the throttle valve body being controlled solely by the fluid forces acting on it.

Preferably means are provided for rotating the obturating member, the obturating member being axially positionable by the hydraulic forces acting upon it.

Preferably also there is a restriction in the said passage. The restriction may be variable in size so that the mass flow through the passage of fuels of different densities may be kept constant.

The means for varying the pressure of the fuel in the passage may comprise pressure relief means which are opened and closed under the control of a governor responsive to engine rotational speed. Thus the pressure relief means may comprise a shaft which is axially movable by the governor, said shaft projecting into a pressure relief orifice in the wall of the passage, the projecting portion of the shaft being provided with at least one groove of varying depth axially, whereby axial movement of the shaft varies the effective size of the pressure relief orifice.

Preferably a part of the conduit is of restricted cross-section and there is a spindle extending through said part and to each side thereof, said spindle being axially movable by means responsive to the outlet pressure of a compressor of the engine and said spindle being provided, where it extends through the restricted part of the conduit, with at least one groove of varying depth axially. In order to reduce the risk of stiction, means are preferably provided for rotating the shaft and spindle.

The spindle may be mounted within at least one annular lip seal which seals the spindle whilst permitting rotation and axial movement thereof. Preferably means (e.g. pressure relief valves) are provided for preventing a pressure difference across the lip seal being reversed in direction.

Figure 2:
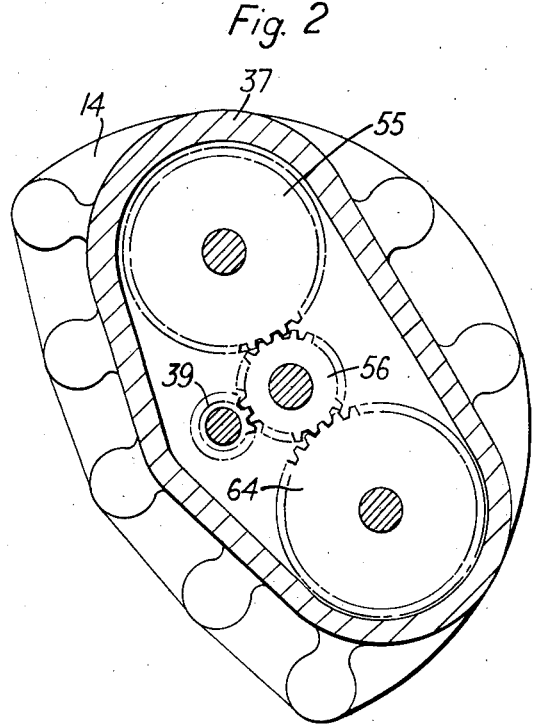

The invention is illustrated, merely by way of example, in the accompanying drawings, in which:

FIGURE 1 is a sectional elevation of a fuel system in accordance with the invention, and FIGURE 2 is a section taken on the line II—II of FIGURE 1.

Referring to the drawings, a fuel tank 10 is connected to a fuel flow control unit 11 by means of a conduit 12 in which is interposed a booster pump 13, the fuel flow control unit being adapted to meter fuel to the burners (not shown) of a gas turbine engine in accordance with engine rotational speed and compressor delivery pressure.

The fuel flow control unit comprises a body member 14, having an internal recess 16 within which is disposed a centrifugal pump rotor 15. The rotor 15 is carried on a shaft 17 which is journalled in a flanged member 18 bolted to the body member 14, the rotor having vanes the inlets to which are disposed in a chamber 19 which communicates with the conduit 12.

The shaft 17, which is coupled to the engine turbine shaft (not shown) for rotation thereby, also supports a housing 17' for a range speed governor 20. The range speed governor 20 comprises two, pivotally mounted, diametrically opposed governor arms 21, incorporating governor weights 22, the arms 21 engaging with one end of a stud 23 carried by the inner race of a ball bearing 24 supported in a sleeve 25.

Gear teeth are formed on that portion of the stud 23 which projects beyond the ball bearing 24, and meshing with the gear teeth are planet wheels 26 which are freely rotatable on spindles 25' carried between the sleeve 25 and a flange 27 formed on the end of a shaft 28.

The planet wheels 26 also mesh with an internally toothed portion of a sleeve 29 splined into a bore 30 in the body member 14. The sleeve 29 houses a spring 31 which is interposed between one end of the sleeve and a spigotted member 32 supported on the outer race of a ball bearing 33 carried on the shaft 28.

The shaft 28 extends through the sleeve 29 and projects through a pressure relief orifice 34 (which is disposed in the end wall 35 of the body member 14) and into a servo space 36. The servo space 36 is bounded by the end wall 35, an annular projection 37 on the end wall 35, and a cover 38. That end of the shaft 28 which is disposed in the servo space 36 carries a gear pinion 39 and is supported by a ball bearing 40 which has its outer race mounted for axial sliding movement in a housing in the cover 38. Adjustable stops 41 and 42 are provided for limiting the axial movement of the shaft 28, whilst that portion of the shaft 28 which is disposed within the pressure relief orifice 34 is provided with a series of grooves 43 which progressively increase in depth axially towards the servo space 36.

The spring 31 is adapted when compressed to increase the load on the governor weights 22 and compression of the spring may be achieved in any convenient manner. For example the external face of the sleeve 29 may be provided with rack teeth, not shown, which are engaged by a worm, also not shown, connected to the pilot's throttle lever so that the sleeve 29 can be moved axially to compress the spring 31 when the worm is rotated. In order that the shaft 28 will be rotated by the shaft 17, the spring 31 is arranged so that it maintains the stud 23 in driven engagement with the governor arms 21 at all times so that when the shaft 17 is being rotated, the shaft 28 will also be rotated.

Two chambers 44 and 45 are formed in the body member 14, the chambers communicating with each other via a metering orifice 46. The chamber 45 also communicates with the outlets from the rotor 15 by means of a drilling 47. In order to control the flow of fuel through the metering orifice 46, a spindle 48 is mounted in the body member 14 and is arranged to extend through the metering orifice 46. One end of the spindle 48 is supported in a bearing 49 in the body member 14, whilst the other end of the spindle extends through the end wall 35, through the servo space 36, and is connected, through the intermediary of a ball bearing 49', to an evacuated capsule 50 carried in a housing 51 mounted on the cover 38.

The capsule 50 is arranged to cause axial movement of the spindle 48 by being progressively collapsed by the delivery of compressor outlet pressure into the housing 51 at a point intermediate of two restrictors 52 and 53, the restrictor 53 being connected to the final delivery stage of the engine compressor by means of a conduit, not shown.

All or part of the interior of the capsule 50, instead of being evacuated, may be supplied with air at the intake pressure either of the whole compressor or of a stage thereof.

A series of axial grooves 54 are formed in that portion of the spindle 48 which extends through the metering orifice 46, and each groove 54 progressively increases in depth axially as it extends from the metering orifice 46 into the chamber 45, whereby as the capsule 50 is collapsed and causes the spindle 48 to move towards the left of the drawing the grooves 54 present an increased depth to the metering orifice 46 and permit an increased flow of fuel through the orifice. A gear wheel 55 is mounted on that portion of the spindle 48 which is disposed in the servo space 36, the said gear wheel 55 meshing with an idler gear 56 mounted in the servo space 36, the idler gear 56 being rotated by the pinion 39 on the shaft 28. Thus when the shaft 28 is being rotated by the engine shaft, the spindle 48 will also be rotated. The rotation of the shaft 28 and spindle 48 reduces the risk that these members will be subjected to striction from dirt or ice entrained in the fuel flow.

In order to pressure balance the spindle 48 it is provided with an axial bore 57 which extends throughout the length of the spindle so that the restricted compressor delivery pressure in the housing 51 can be applied to that end of the spindle 48 which is disposed in the bearing 49.

Annular lip seals 58 and 59 (e.g. of rubber) are mounted on the spindle 48 between the servo space 36 and the housing 51 and between the chamber 45 and the bearing 49 respectively, the pressure difference across the seals 58 and 59 permitting a viscous leak through the seals to wet the seals and reduce friction.

Opposite faces of the seals 58, 59 are respectively subjected to the restricted compressor delivery pressure and to the pressure on the low pressure side of the pump 15. Under starting conditions, the pressure on the low pressure side of the pump is greater than the restricted compressor delivery pressure so that there is a pressure drop across the seals 58, 59 in one direction.

At top speed, however, pump inlet pressure falls and restricted compressor delivery pressure rises. In order, therefore, to prevent the said pressure drop across the seals 58, 59 reversing in direction, with consequent wear on the seals, non-return valves (not shown) are provided in drillings which communicate with the low pressure side of the pump 15 and which are respectively indicated in part at 58', 59'.

A piston 60 whose axial position is dependent upon the pressure drop across the metering orifice 46, is disposed in a bore 61 in the body member 14. The position of the piston 60 in the bore 61 is controlled solely by the balance of the fluid forces acting on the piston. The bore 61, inwardly of the piston 60, communicates with the chamber 44 by means of a drilling 62, the said bore 61 having an outlet 63 which is connected to the engine burners, by means of a conduit, not shown. One end of the piston 60 is disposed in the servo space 36 and is provided with a gear wheel 64 which meshes with the idler gear 56 whereby the piston 60 is rotated within the bore 61. The rotation of the piston 60 reduces the risk of stiction.

The gear wheel 64 has opposite pressure surfaces 68, 69 which are respectively disposed adjacent to and remote from the bore 61. The end of the piston 60 remote from the gear wheel 64 has a pressure surface 67.

The piston 60 therefore has in effect, two oppositely facing pressure surfaces, one of which is constituted by the pressure surface 67 and the other of which is constituted by the difference between the areas of the surface 68, 69. These two oppositely facing pressure surfaces are of equal area. Accordingly when the pressures in the servo space 36 and the bore 61 are equal, the piston 60 maintains a balanced condition.

However should any pressure differences occur between the servo space 36 and the bore 61 then the piston 60 will move towards the area of reduced pressure.

Fuel is fed into the servo space 36 through a passage 65 which communicates with the drilling 47 upstream of the orifice 46 and which is provided with a restriction 66. A filter (not shown) may be provided in the passage 65. A quantity of the fuel in the servo space 36 is returned to the chamber 19, on the low pressure side of the pump 15, through the pressure relief orifice 34. The relative areas of the restriction 66 and the pressure relief orifice 34 are such that a predetermined pressure drop between pump delivery pressure and the pressure within the servo space 36 is obtained. The construction of the pump 15 is such that the pump delivery pressure is substantially proportional to the square of the speed of the engine times fuel density.

The cross-sectional area of the restriction 66 is preferably adjustable, by means not shown, to compensate for variation in density of different fuels. Thus the size of the restriction 66 may be adjusted so that, whatever the density of the fuel employed, the mass flow through the passage 65 is maintained at a constant predetermined value. The restriction adjustment means may be calibrated in terms of density.

When the above described fuel flow control unit is in use, fuel from the tank 10 is pressurised by the rotor 15 and fed via the drilling 47, to the chamber 45, the fuel then being metered through the orifice 46 (the size of which will depend upon the position of the spindle 48). The fuel then passes into the passage 62 and bore 61 and through the outlet 63 to the engine burners.

Simultaneously with the metering of the fuel through the metering orifice 46, fuel passes through the passage 65 and restriction 66 into the servo space 36 and then returns to the chamber 19 through the pressure relief orifice 34. Thus a predetermined pressure drop is obtained between the pressures prevailing in the chamber 45 and the servo space 36 respectively. The flow through the pressure relief orifice 34 is determined by the setting of the shaft 28. This setting will itself be determined (until the governor 20 comes into operation) by the extent to which the pilot has compressed the spring 31 which whilst it is being compressed causes axial movement of the shaft 28 towards the right of the drawings and thereby presents an increased depth of the grooves 43 to the pressure relief orifice 34. During an acceleration the setting of the shaft 28 to permit maximum flow through the orifice 34 is determined by the setting of the stop 42.

The extent to which the spring 31 is compressed determines the datum setting of the governor 20 so that the governor will overcome the resistance of the spring 31 when a certain speed of rotation is attained and cause axial movement of the shaft 28 towards the left as seen in FIGURE 1.

Therefore should the pressure drop across the metering orifice 46 exceed the pressure drop between pump pressure and pressure in the servo space 36 (i.e. the pressure drop across the restriction 66), then the piston 60 will be caused to move to the right as seen in FIGURE 1 to reduce fuel flow through the outlet 63 until the pressure in the bore 61 equals the pressure in the servo space 36. Thus the fuel flow to the engine burners is reduced to a value acceptable to the engine.

As the rotational speed of the engine increases, the delivery pressure of the engine compressor also increases and therefore the capsule 50 is progressively collapsed whereby the spindle 48 is caused to move axially to the left of the drawing and present an increased depth of groove 54 to the metering orifice 46, whereby the pressure drop across the metering orifice is decreased. As the pressure drop across the metering orifice 46 decreases there is a pressure increase in the bore 61. The piston 60 is therefore caused to move to the left of the drawing so that fuel flow to the burners is increased.

With the increase in fuel flow to the burners there is an increase in engine rotational speed. Pump delivery pressure therefore increases and there is an increase in the pressure in the servo space 36. The flow to the burners must also increase so that the pressure in the servo space equals the pressure in the bore 61 whereby the piston 60 attains a hydraulic balance.

If however the pressure drop across the metering orifice 46 exceeds the pressure drop between the pump pressure and the pressure in the servo space then, as previously described, the fuel flow to the burners is reduced.

When the engine rotational speed nears the maximum for any given setting of the spring 31, the governor arms 21 cause the shaft 28 to move to the left of the drawing whereby the flow area through the orifice 34 is reduced by the grooves 43 presenting a decreased depth to the orifice. The pressure in the servo space thus increases and exceeds the pressure in the bore 61, causing the piston 60 to move to the right and reduce fuel flow to the burners.

The operation described in the preceding paragraph is carried out whatever may be the setting of the spring 31. During decelerations the force exerted by the weights 22 overcomes the force set up by the compression of the spring 31, and the outer face of the bearing 40 is moved into contact with the stop 41.

During starting of engines fitted with the above described fuel flow control unit, the pressures generated by the centrifugal pump 15, whilst permitting light up of the burners, may not be sufficient to enable acceleration to take place.

Therefore the booster pump 13 is adapted, when starting is taking place, to generate sufficient pressure to enable sufficient fuel to be supplied to the burners for an acceleration. The booster pump 13 is also adapted (by means not shown) to reduce its output pressure when the centrifugal pump 15 is generating sufficient pressure to permit acceleration.

In order to maintain the unit full of fuel on engine shut down, the piston 60 is preferably connected to the pilot's throttle lever so that, when the lever is moved to shut down the engine, the piston 60 blocks the outlet 63, thereby retaining the unit full of fuel.

Pressure relief means (not shown) may, if desired, be provided cross the pump 15 to ensure that the pressure rise across the pump does not exceed a predetermined value.

If desired, the grooves 43 could be dispensed with, the flow of fuel from the servo space 36 to the inlet side of the pump 15 being arranged to occur through an axial hole in the shaft 28, the size of the axial hole being varied by a needle valve whose position relative to the hole is controlled by the governor 20.

It will be appreciated that the fuel system described with reference to the drawings employs relatively few parts, as compared with conventional fuel systems, and that its weight may be kept very low. The fuel system described with reference to the drawings also gives a fuel flow per engine revolution proportional to compressor delivery pressure, whereby the flame temperature of the burners may be maintained nearly constant over the starting cycle of the engine.

We claim:
1. A gas turbine engine fuel system comprising a throttle valve body having a port therein, a valve obturating member having oppositely facing pressure surfaces and freely movable in said valve body so as to throttle fuel flow through said port, said pressure surfaces being of equal effective areas, an engine driven centrifugal fuel pump, a conduit connecting the delivery side of the pump to one pressure surface of the obturating member, a metering orifice in said conduit, means for continuously varying the size of the metering orifice in functional dependence upon the value of a compressor pressure, a passage interconnecting the conduit, on the upstream side of the metering orifice, with the other pressure surface of the obturating member, and governor means for continuously varying the pressure of the fuel in the passage to effect closing movement of the valve obturating member when the engine rotational speed exceeds a selected predetermined value, the position of the obturating member in the throttle valve body being controlled solely by the action of fluid forces acting on its pressure surfaces.

2. A gas turbine engine fuel system comprising a throttle valve body having a port therein, a valve obturating member having oppositely directed pressure surfaces and slidable axially in said valve body so as to throttle fuel flow through said port, said pressure surfaces being of equal effective areas, an engine driven centrifugal fuel pump, a conduit connecting the delivery side of the pump to one pressure surface of the obturating member, a metering orifice in said conduit, means for continuously varying the size of the metering orifice in functional dependence upon the value of a compressor pressure, a passage interconnecting the conduit, on the upstream pressure surface of the metering orifice, with the other side of the obturating member, pressure relief means for varying the pressure of the fuel in the passage, to effect closing movement of the valve obturating member, a governor responsive to the engine rotational speed, and means connecting said governor for controlling operation of the pressure relief means when a selected predetermined speed is exceeded, the position of the obturating member in the throttle valve body being controlled solely by the fluid forces acting on its pressure surfaces.

3. A gas turbine engine fuel system comprising a throttle valve body having a port therein, a valve obturating member having oppositely directed pressure surfaces and slidable axially in said valve body so as to throttle fuel flow through said port, said pressure surfaces being of equal effective areas, an engine driven centrifugal fuel pump, a conduit connecting the delivery side of the pump to one pressure surface of the obturating member, a metering orifice in said conduit, means for continuously varying the size of the metering orifice in functional dependence upon the value of a compressor pressure, a passage interconnecting the conduit, on the upstream side of the metering orifice, with the other pressure surface of the obturating member, means providing said pressure surfaces being of equal effective areas, a pressure relief orifice in a wall of the passage, a shaft a portion of which projects through said pressure relief orifice, said shaft having at least one groove therein of varying depth axially, a governor responsive to engine rotational speed, and means connecting said governor to said shaft so as to effect axial movement thereof whereby to vary the pressure of the fuel in the passage and, hence, effect closing movement of the valve obturating member when the engine rotational speed exceeds a selected predetermined value, the position of the obturating member in the throttle valve body being controlled solely by the fluid forces acting on its pressure surfaces.

4. A gas turbine engine fuel system comprising a throttle valve body having a port therein, a valve obturating member having oppositely facing pressure surfaces and freely movable in said valve body so as to throttle fuel flow through said port, said pressure surfaces being of equal effective areas, a fuel pump, a conduit connecting the delivery side of the pump to one pressure surface of the obturating member, a metering orifice in said conduit, an axially movable spindle extending through said metering orifice, means continuously responsive to a value of a given engine pressure and connected to the spindle for effecting axial movement thereof, said spindle being provided, where it extends through the metering orifice, with at least one groove of varying depth axially, whereby the effective size of the metering orifice varies in dependence upon the value of the said given engine pressure, a passage interconnecting the conduit, on the upstream side of the metering orifice, with the other pressure surface of the obturating member, and governor means for varying the pressure of the fuel in the passage when the engine rotational speed exceeds a predetermined value, the position of the obturating member in the throttle valve body being controlled solely by the fluid forces acting on its pressure surfaces.

5. A gas turbine engine fuel system comprising a throttle valve body having a port therein, a valve obturating member having oppositely facing pressure surfaces and freely movable in said valve body so as to throttle fuel flow through said port, said pressure surfaces being of equal effective areas, an engine driven centrifugal fuel pump, a conduit connecting the delivery side of the pump to one pressure surface of the obturating member, a metering orifice in said conduit, an axially movable spindle extending through said metering orifice, means for effecting rotation of said spindle at least one annular lip seal within which the spindle is mounted, said lip seal sealing the spindle whilst permitting rotation and axial movement thereof, means continuously responsive to a pressure functionally related to a compressor pressure and connected to the spindle for effecting axial movement thereof, said spindle being provided, where it extends through the metering orifice, with at least one groove of varying depth axially, whereby the effective size of the metering orifice varies in dependence upon the value of the said compressor pressure, a passage interconnecting the conduit, on the upstream side of the metering orifice, with the other pressure surface of the obturating member, and governor means for varying the pressure of the fuel in the conduit passage to effect closing movement of the valve obturating member when the engine rotational speed exceeds a predetermined value, the position of the obturating member in the throttle valve body being controlled solely by the fluid forces acting on its pressure surfaces.

6. A gas turbine engine fuel system comprising a throttle valve body having a port therein, a valve obturating member having oppositely facing pressure surfaces and freely movable in said valve body so as to throttle fuel flow through said port, said pressure surfaces being of equal effective areas, an engine driven centrifugal fuel pump, a conduit connecting the delivery side of the pump to one pressure surface of the obturating member, a metering orifice in said conduit, an axially movable spindle extending through said metering orifice, means continuously responsive to a pressure functionally related to a compressor pressure and connected to the spindle for effecting axial movement thereof, said spindle being provided, where it extends through the metering orifice, with at least one groove of varying depth axially, whereby the effective size of the metering orifice varies in dependence upon the value of the said compressor pressure, a passage interconnecting the conduit, on the upstream side of the metering orifice, with the other pressure surface of the obturating member, means providing a pressure relief orifice in the wall of the conduit passage, a shaft a portion of which projects through said pressure relief orifice, said shaft having at least one groove therein of varying depth axially, and a governor responsive to engine rotational speed, said governor being connected to said shaft so as to effect axial movement thereof whereby to vary the pressure of the fuel in the conduit passage to effect closing movement of the valve obturating member when the engine rotational speed exceeds a selected predetermined value, the position of the obturating member in the throttle valve body being controlled solely by the fluid forces acting on its pressure surfaces.

7. A gas turbine engine fuel system as claimed in claim 6 comprising means for rotating said shaft and said spindle.

References Cited in the file of this patent

UNITED STATES PATENTS

| | | |
|---|---|---|
| 2,649,686 | Lawrence et al. | Aug. 25, 1953 |
| 2,668,416 | Lee | Feb. 9, 1954 |
| 2,778,191 | Thompson | Jan. 22, 1957 |
| 2,923,128 | Fortmann | Feb. 2, 1960 |
| 2,971,339 | Gold et al. | Feb. 14, 1961 |
| 2,983,100 | Dietrich et al. | May 9, 1961 |
| 2,986,126 | Werts | May 30, 1961 |

FOREIGN PATENTS

| | | |
|---|---|---|
| 1,134,891 | France | Dec. 10, 1956 |
| 1,144,275 | France | Apr. 23, 1957 |